Jan. 1, 1924
E. E. WHITING
TRIPOD
Filed April 14, 1922
1,479,765
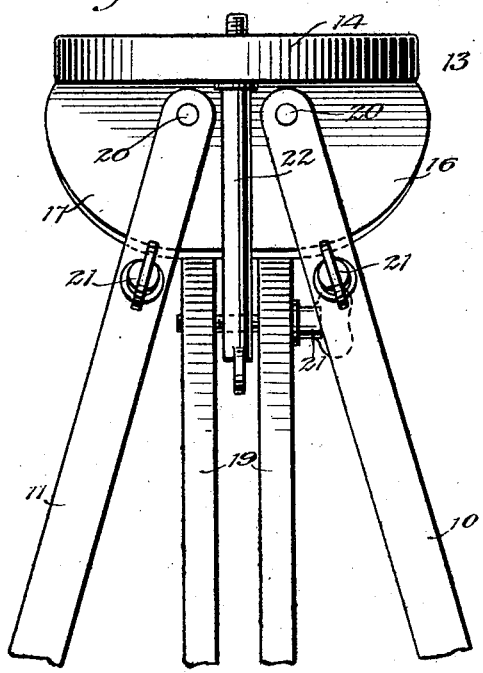
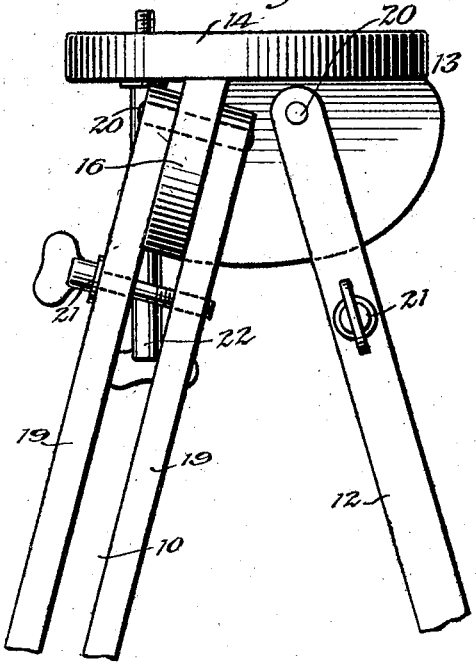
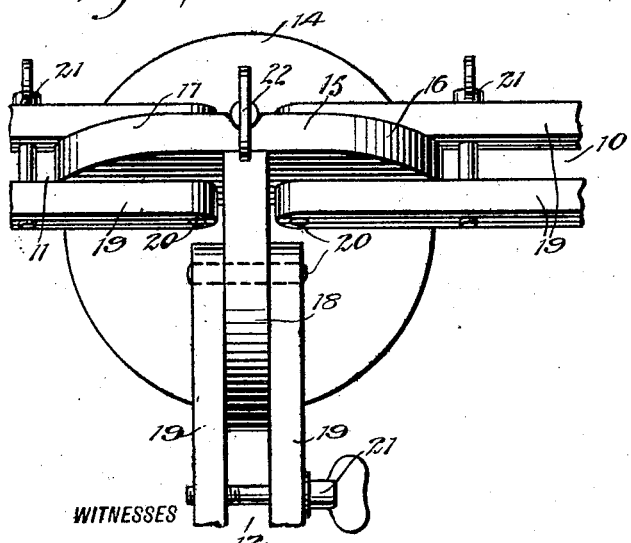
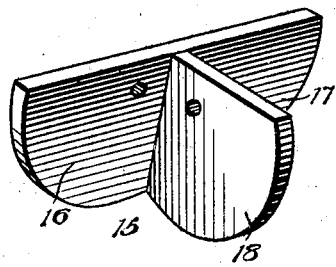
WITNESSES
Edw. Thorpe
H. Harrison Ott
INVENTOR
Emmett E. Whiting
BY
ATTORNEYS Patented Jan. 1, 1924.

1,479,765

UNITED STATES PATENT OFFICE.

EMMETT EDWIN WHITING, OF WABASHA, MINNESOTA.

TRIPOD.

Application filed April 14, 1922. Serial No. 552,716.

*To all whom it may concern:*

Be it known that I, EMMETT E. WHITING, a citizen of the United States, and a resident of Wabasha, in the county of Wabasha and State of Minnesota, have invented a new and Improved Tripod, of which the following is a full, clear, and exact description.

The present invention has relation to tripods for supporting cameras, telescopes, surveying instruments or the like, and refers more particularly to an improvement in the construction of the tripod head.

In the common construction of tripods, the legs are pivotally connected to the tripod head for radial swinging movements with respect thereto and many disadvantages and objections have been found to the ordinary construction in view of the fact that no provision is made for locking the legs against relative movement with respect to the head.

The present invention contemplates a tripod including an improved head and form of leg connection therewith for overcoming the disadvantages and objections to said common form of tripod.

One of the objects and advantages of the present invention resides in the provision of means for effecting the locking and retention of the legs in a predetermined position with respect to the tripod head whereby when so locked and retained, the device may be lifted and transported or the location shifted for the purpose of obtaining the proper focus without affecting the relative angular adjustment of the legs and head.

Another object of the invention resides in the provision of an improved tripod construction, by means of which the proper lateral leveling of the head and instrument supported thereby may be obtained, when the supporting surface is uneven, without the necessity of effecting telescopic adjustment of the legs.

As a further object the invention contemplates an improved tripod construction by means of which the head and the instrument carried thereby may be inclined to point the instrument at an object on the supporting surface near the end of the tripod or at an object at an elevation with respect to the tripod.

As a still further object and advantage, the means for locking the legs against relative movement with respect to the head functions to properly support an instrument from a smooth or slippery surface such as a waxed or tile floor, or the like.

Another object in view resides in the provision of means for associating an instrument with the head, which is disposed in a more convenient position for manipulation than in the common system of tripod, where said means is located centrally of the legs.

Furthermore the invention contemplates a device of the character described which is extremely simple and inexpensive to produce, strong and durable in its construction, and which may be folded compactly to occupy a minimum amount of space when not in use.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1 is a fragmentary rear elevation of a tripod constructed in accordance with the invention.

Fig. 2 is a side view thereof.

Fig. 3 is a bottom plan view.

Fig. 4 is a detail perspective view of the leg attaching lug carried by the head.

Referring to the drawing by characters of reference, 10 and 11 designate respectively the right and left rear legs and 12 the front leg which may be of the usual telescopic construction for the purpose of adjusting their length. The head designated generally by the character 13 includes a top or supporting table 14 for the instrument to be associated with the tripod and a depending substantially T-shaped member 15 which may be formed as a separate element or integral part of the head. The T-shaped member depends from the under side of the top or table 14 and consists of a pair of rear webs 16 and 17 which extend laterally and in alignment with respect to each other. The webs 16 and 17 are identically inclined downwardly and rearwardly from the head. The member 15 further includes a front web 18 which depends vertically from the under side of the top or table 14 and extends longitudinally forward from the webs 16 and 17. Each of the legs are constructed from a pair of parallel spaced strips 19 or are bifurcated at their upper ends to form substantially parallel furcations 19 to receive therebetween the webs or legs 16, 17 and 18. The upper extremities of the strips and furcations 19 and the webs are provided with registered apertures for the reception of a pivot pin 20 for pivotally associating the legs with the webs of the T-shaped member. Under this arrangement the right and left rear legs 10 and 11 are supported at a downward and rearward inclination and are guided in their lateral swinging movements on their pivots 20 by the coacting engagement of the parallel spaced strips or furcations 19 with the webs or lugs 16 and 17. Likewise the front leg 12 is supported from the front web or lug 18 for longitudinal swinging movement by the coacting engagement of the spaced parallel strips or furcations with the front web. It will also be noted that the front web 18 constitutes an abutment adapted to coact with the rear legs to limit the inward swinging movement of the same to a vertical position as viewed from the rear, while the top or table 14 constitutes an abutment for limiting the outward and upward swinging movement thereof. The front leg 12 is limited in its forward or rearward swinging movement by the lugs 16 and 17 and the top or table 14. In order to provide means for locking and retaining the legs against swinging movement in variously adjusted positions, a set screw 21 is passed through the spaced strips or furcations 19 immediately beyond the outer edges of the webs whereby upon manipulation of the set screws in opposite directions a clamping or releasing action of the strips or furcations is effected with respect to the opposite side faces of the webs. The juncture of the rear webs 16 and 17 with the table or top 14 is disposed at an appreciable distance from the rear periphery or edge of the table and as illustrated the attaching element 22 for associating the instrument with the tripod is arranged and associated with the table in the area which lies in rear of said webs. This affords means for more conveniently manipulating the attaching element than where the attaching element is disposed centrally of the tripod between the legs as in the ordinary construction.

In use and operation, when the set screws 21 are manipulated to release the strips or furcations from their clamping action, the rear legs 10 and 11 are free for swinging movements laterally, while the front leg is free for swinging movements forward and rearwardly. When the proper adjustment of the legs is obtained, the set screws 21 are manipulated to effect a clamping action between the strips or furcations 19 and the webs whereby the legs are locked and retained against relative movement with respect to each other and the top or table, thus admitting of the lifting of the complete device and transportation or shifting of the same without danger of spoiling the adjustment. It is also obvious that the means for permitting the locking of the legs in their adjusted positions facilitates the use of this tripod on slippery supporting surfaces, such as waxed or tile floors. To further illustrate an advantage, where the tripod is supported from a laterally inclined surface and it is essential under the common form of tripod to adjust the legs telescopically to effect the proper lateral leveling of the top or table, the leveling by use of this tripod is accomplished simply by lifting the front leg from contact with the supporting surface and swinging said front leg together with the top or table and the T-shaped member laterally while the rear legs 10 and 11 remain stationary. When the front leg, as viewed from the front or rear is disposed in a vertical position, the leveling will have been accomplished without the necessity of telescopically adjusting the legs of the tripod. Under the present construction it is possible to lower the top of the tripod substantially to a level with the floor or any other distance from the floor and retain the same in such position by tightening the set screws. Furthermore if it is desired to point the instrument at an object on the supporting surface near the end of the tripod, this may be accomplished by swinging the front leg forwardly to its limit, or to a point where it coacts and abuts with the top or table 14. To point the same at an object at an elevation it is only necessary to reverse the position of the instrument on the table.

When not in use the legs may be swung inwardly toward each other and if telescopic legs are used the same may be further contracted to reduce the whole device to a compact article, using the set screws 21 to retain the legs in contracted position.

I claim:

1. In a tripod, a tripod head, a depending T-shaped member from the under side of said head comprising rear laterally projecting lugs or webs and a forwardly extending longitudinal lug or web, a supporting leg pivotally attached to each lug or web, and means carried by each leg for locking and retaining the same against relative movement with respect to the T-shaped member and head.

2. In a tripod, a tripod head, a substantially T-shaped member depending therefrom embodying aligned transversely extending downwardly and outwardly inclined lugs or webs and a forwardly longitudinally disposed lug or web, rear supporting legs pivotally attached to the rear lugs or webs for lateral swinging movements, a front supporting leg pivotally attached to the front lug or web for longitudinal swinging movements, the legs having at their upper ends ends spaced members receiving the said lugs or webs and means carried by each leg for clamping and locking said legs against swinging movement.

3. In a tripod, a tripod head, a substantially T-shaped member depending therefrom embodying aligned transversely extending downwardly and outwardly inclined lugs or webs and a forwardly longitudinally disposed lug or web, rear supporting legs pivotally attached to the rear lugs or webs for lateral swinging movements, a front supporting leg pivotally attached to the front lug or web for longitudinal swinging movements, said legs having at their upper ends spaced members receiving the said lugs or webs, means carried by each leg for clamping and locking said legs against swinging movement, and means for attaching an instrument to said head consisting of an attaching element extending therethrough in rear of the rear lateral lugs or webs.

4. In a tripod, a head provided on its under side with a T-shaped member embodying transverse extending and aligned webs and a forwardly extending web, legs each formed of a pair of members having their upper ends extending on opposite sides of a web and pivoted thereto, and means for clamping the members of the legs in the webs.

5. In a tripod, a head provided on its under side with a T-shaped member forming two aligned webs and a right angular web, three legs each formed of two members, two of the legs receiving the aligned webs between their members and pivoted thereto and the other leg receiving the right angular web between its members and pivoted thereto, and set screws connecting the members of the legs together and clamping them upon the webs.

EMMETT EDWIN WHITING.